Figure 10:
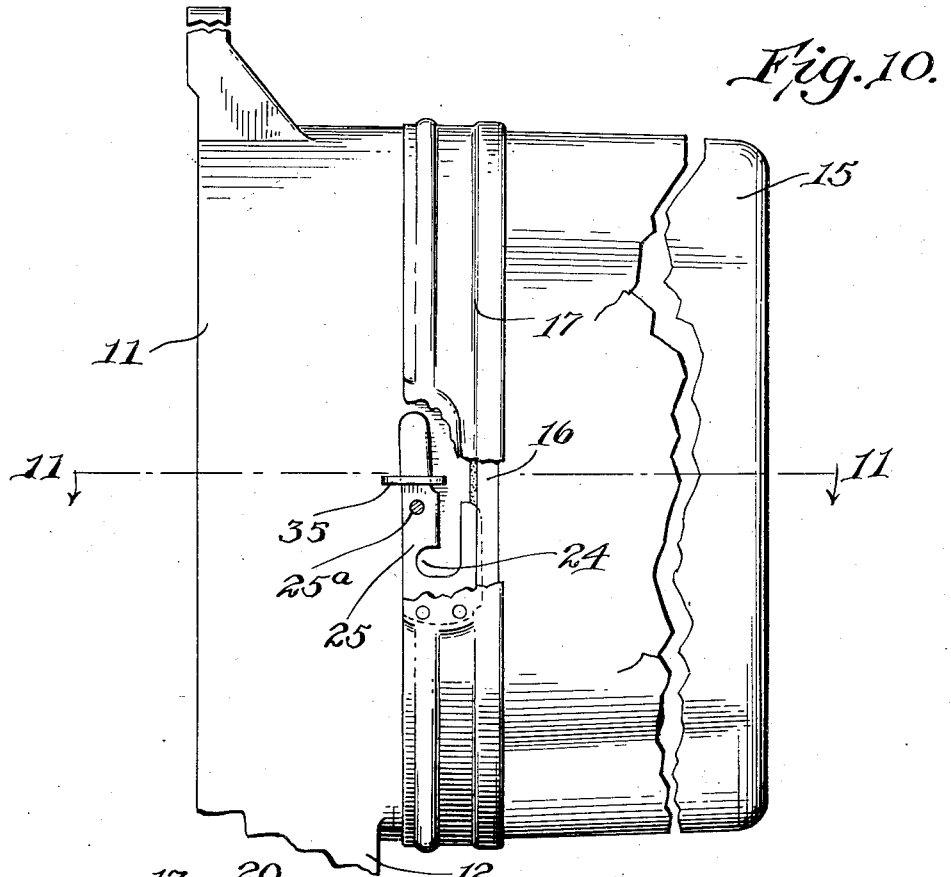

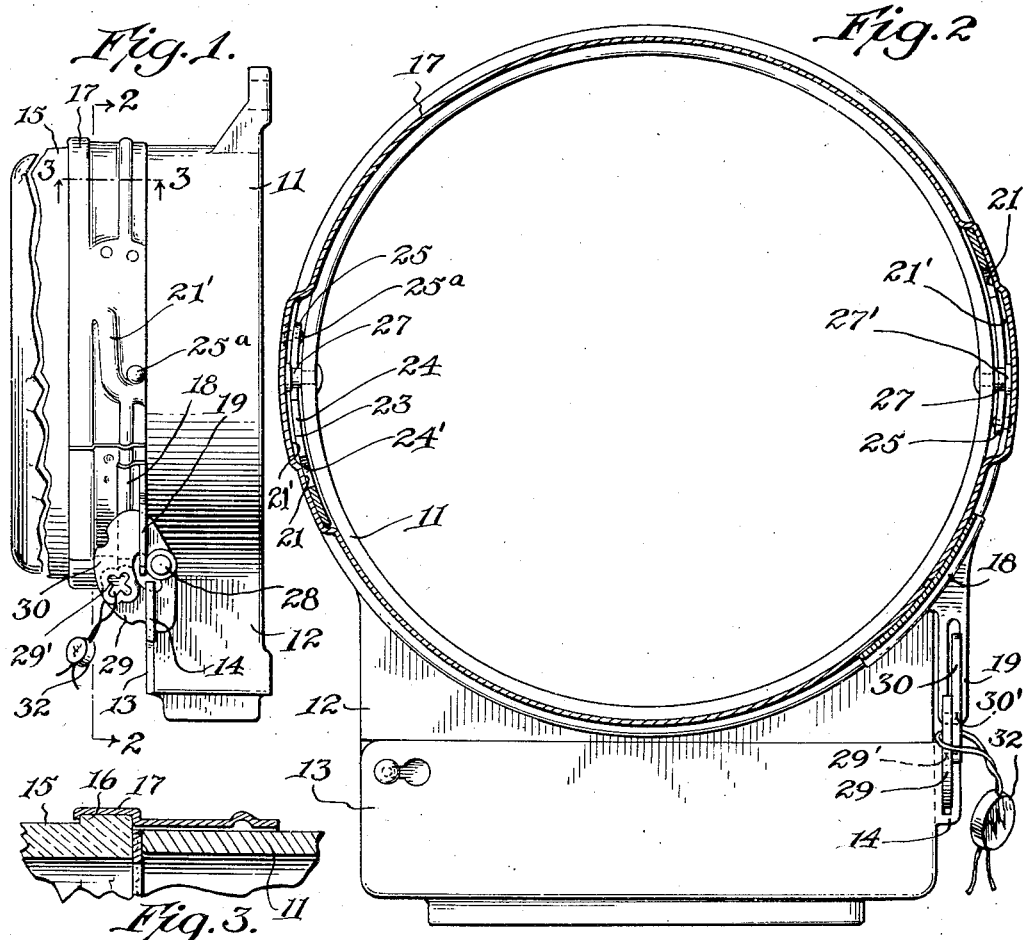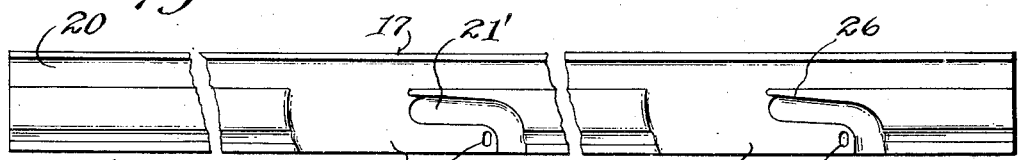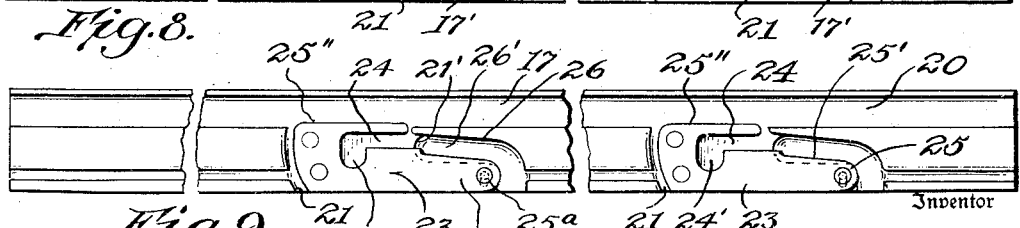

July 25, 1933.                A. L. EMENS                 1,919,214
                            ELECTRICITY METER
                        Filed Sept. 24, 1931           3 Sheets-Sheet 2
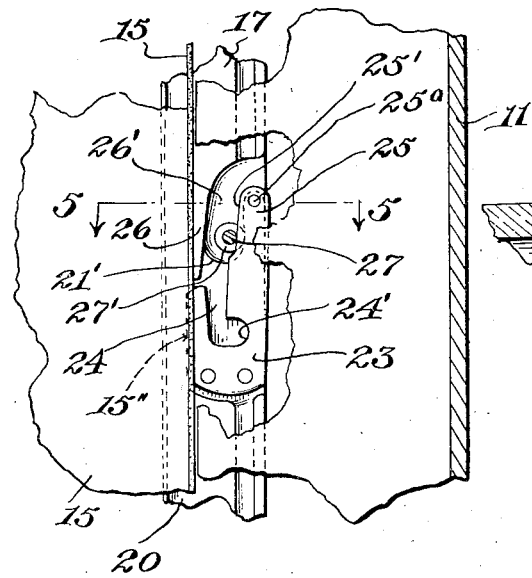
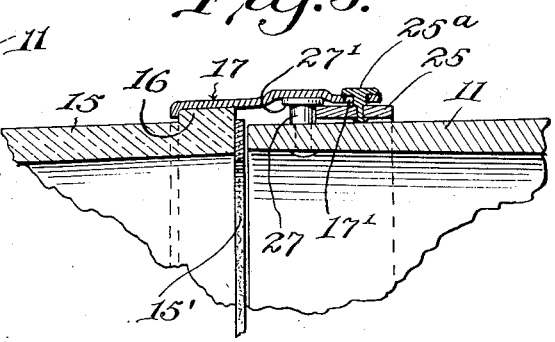
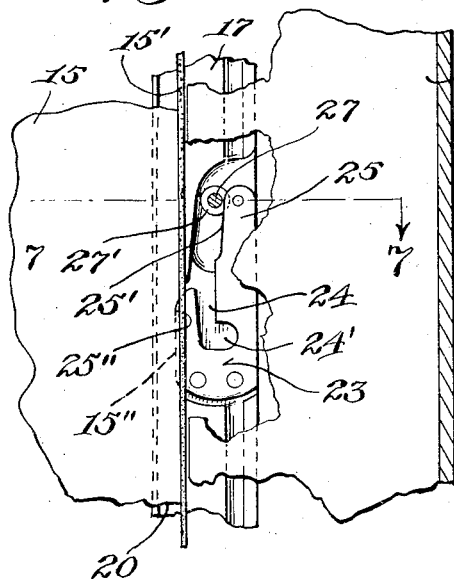
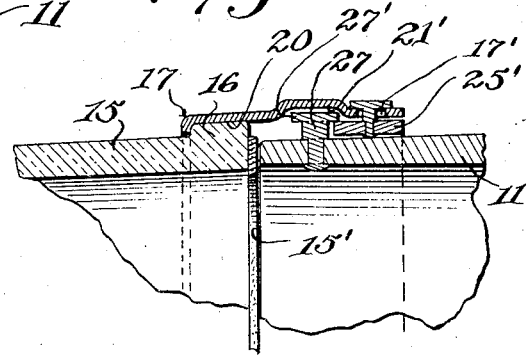
Inventor
Albert L. Emens
By Henry T. Bright
Attorney Inventor
Albert L. Emens
By Henry T. Bright
Attorney Patented July 25, 1933

1,919,214

UNITED STATES PATENT OFFICE

ALBERT L. EMENS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER

Application filed September 24, 1931. Serial No. 564,945.

My invention relates to electricity meters of the general type disclosed and claimed in my prior application Serial Number 446,036 and of which my present application is a continuation in part.

It is the purpose of my present invention to provide a bayonet lock between the meter cover and base in which the flexible member of the lock may be freely flexed over a range within its elastic limit sufficient to allow for structural variations in manufacture or variations in the thickness of the gasket between the cover and base and thus assure tight application of the cover to the base and correct positioning of parts carried by the cover with respect to parts carried by the base, when said cover is fully applied to the base, irrespective of such variations; but which embodies means effective, upon attempt to force or pry the cover from the base when the cover is locked, to limit flexing of the flexible member of the bayonet lock beyond the aforesaid range and thereby prevent movement of the cover from the base a distance sufficient to permit the insertion of a wire within the meter casing for the purpose of interfering with the proper operation of the meter; or to cause the flexible member of the bayonet lock to become permanently distorted so that the cover can be easily raised at will for insertion of a meter tampering element and said element subsequently removed and the cover returned to its normal locked position without leaving any readily observable evidence that the meter has been tampered with.

Furthermore, my invention contemplates the provision of means for preventing relative displacement of the elements of the bayonet lock out of operative relation when the cover is locked to the base and an outward radial pry is exerted upon the element of the lock which is carried by the metal band of the cover.

My invention also aims to provide an improved method of applying to the meter cover the usual metallic band which telescopes over the base. Heretofore, such bands have been formed by pressed endless rings and the use of such rings does not permit of sufficient tolerance in manufacture as to the diameter and circumference of the cover. In my method I build up the band upon the cover by securing a tie-plate, in the present instance in the form of a combined tie plate and meter sealing bracket, to one end of a metal strip, encircling the cover with the strip, and then securing the other end of the strip to the tie-plate and thus completing the formation of the band and its application to the cover. This method enables me to use a brass band at a cost no greater than a steel band and in addition to use covers whose diameters and circumferences vary more than it is possible to have them vary when a pressed ring is used.

In the drawings chosen to illustrate my invention, the scope whereof is set forth in the appended claims,

Figure 1 is a side elevation of a meter embodying my invention, the cover being broken away, and in locked position on the meter base;

Figure 2, an enlarged section on the line 2—2 of Figure 1;

Figure 3, a section on the line 3—3 of Figure 1;

Figure 4, a fragmental view looking outwardly from the interior of the cover and base and showing the status of the bayonet lock between the base and cover when the latter has been rotated to locked position on the cover;

Figure 5, a section on the line 5—5 of Figure 4;

Figure 6, a view similar to Figure 4 with the cover about to be rotated to locked position on the base;

Figure 7, a section on the line 7—7 of Figure 6;

Figure 8, an inner view of the metal cover band forming strip with the bayonet tongue plates removed;

Figure 9, a view similar to Figure 7 with the bayonet tongue plates in place;

Figure 10, a fragmental view of a meter casing disclosing an alternative form of my invention;

Figure 11:
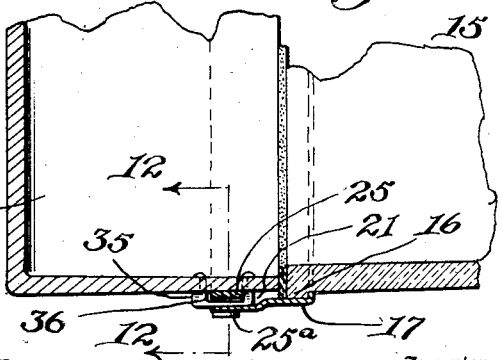
Figure 12:
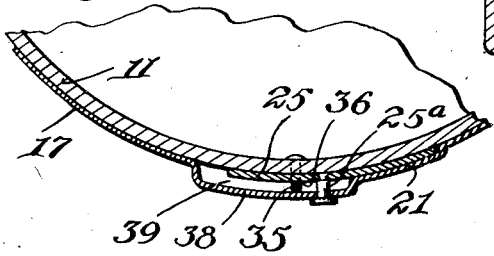

Figure 11, a section on the line 11—11 of Figure 10;

Figure 12, a section on the line 12—12 of Figure 11; and

Figure 13:
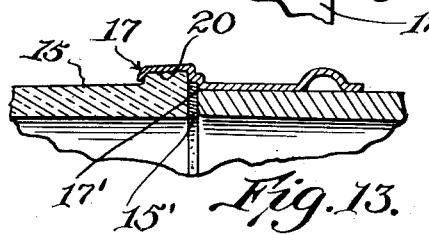

Figure 13, a detail section similar to Figure 3 showing a modified arrangement for securing the gasket to the cover.

Referring to the drawings the base element of the meter casing is shown as embodying a cylindrical portion 11 having an extension 12 constituting a terminal chamber adapted to be closed by a removable cover 13, said cover having a perforated wing 14 for a purpose that will presently appear. The cover element of the meter casing is indicated at 15 and is shown as cup shaped and formed of glass. The rim of the cover is provided with a circumscribing flange 16.

The cover 15 carries a metallic band 17 formed from a strip whose ends are connected by a sealing bracket 18, said bracket having a laterally directed perforated wing 19 for a purpose to be hereinafter referred to. The band 17 is formed to provide an interior groove 20 which receives the flange 16 to secure the band to the cover. The band 17 is also formed at opposite points to provide corresponding recesses 21 in its inner face, each of said recesses interrupting a wall of the groove 20. The band 17 is further formed, within the limits of each recess 21, to provide a supplemental recess 21'. In each recess 21 there is mounted a plate 23 having a recess 24 and an arm 25. The inner end of the recess 24 is extended laterally as at 24' to weaken the arm 25 at its inner end and there provide a flexing point for the arm in the operation of the bayonet lock of which latter the arm forms the flexible element. The edge 25' of the arm 25 is inclined and said edge and the free end of the arm are spaced from the wall 26 of recess 21 to provide a space 26' in which the pin element of the lock, to be presently referred to, travels in securing and detaching the cover 15 to and from the base portion 11. It will be further noted that each plate has a portion 25" which projects slightly into the groove 20 and said portion, when the cover 15 is associated with the band 17, enters a recess 15" in the rim of the cover 15, so as to lock the band and cover against relative rotation. The band 17 telescopes over the cylindrical portion 11 of the base, which portion carries outwardly directed bayonet pins 27 positioned to pass into respective spaces 26' when the cover is applied. After the cover is applied to the base rotation thereof in a clockwise direction will cause each pin 27 to cooperate with the inclined edge 25' of its related arm with the result that the cover is wedged upon a gasket 15' and tightly secured to the base. When this operation of locking the cover to the base is complete each arm 25 will be flexed to the position shown in Figure 4. Reverse rotation of the cover will release the latter from the base in a manner that will be obvious. It will be observed that each arm 25 extends over the supplemental recess 21' and cooperates with the base of the latter to form a channel which receives a circumscribing flange 27' on the pin 27 to thereby provide an effective means of preventing displacement of the pin 27 from operative relation to the arm 25 by an outward pry of the band 17 when the cover is locked to the base.

In order that each arm 25 may be freely flexed over a range sufficient to allow for structural variations in manufacture and variations in the thickness of the gasket 15', but limited in flexing beyond such range, upon attempt to force or pry the cover from the base when the cover is locked, I fixedly mount on the arm 25 a rivet 25ª the shank of which extends through an opening 17' in the band 17. This opening 17' is of sufficient area to allow limited play of the body of the rivet from a neutral position therein, as shown in Figure 6, before said body engages the wall of the opening and the extent of this permissible play is sufficient to allow correct operation of the bayonet lock irrespective of variations in manufacture. However, if attempt is made to force or pry the cover from the base when the cover is locked, the body of the rivet 25ª will engage the wall of the opening 17' and additional flexing of the arm 25 prevented. By thus limiting the flexing of the arm 25, I provide a "studless" cover construction wherein it is impossible to successfully tamper with a contained meter for purposes of current theft without leaving readily observable evidence that the meter has been tampered with.

To seal the cover against rotation to release the bayonet locks between the cover and base, I pivot on the terminal chamber 12 through the instrumentality of a common pivot pin 28, locking members 29 and 30. As shown in Figures 1 and 2, the locking member 29 is pivoted to engage through the perforation of the wing 14, while the member 30 is pivoted to engage through the perforation of the wing 19, when a sealing wire is looped through openings 29' and 30' in the members 29 and 30 respectively and its ends secured together by a sealing slug 32, it being observed that the seal thus formed also prevents removal of the terminal chamber cover 13 without breaking the seal.

It is important also to note that in connecting the ends of the band 17 by the sealing bracket 18, I rigidly attach the latter to one end of the band before assembling the same on the cover, and then rigidly attach the bracket to the other end of the band after the latter is assembled on the cover. This structure and the method incident to its production and assembly with the cover not only holds the ends of the band in fixed relative position, but also enables me to employ a brass band at a cost no greater than that of a steel band and in addition to use covers whose diameters vary more than it is possible to have them vary when a pressed ring is used.

In the alternative form of my invention, shown in Figures 10, 11 and 12, I dispense with the bayonet pins on the base and substitute for each pin a cover lock 35 of U-shape the free ends of whose arms are attached to the base 11 so as to provide a passage 36. The bottom wall of the recess 21 is shaped to provide a supplemental recess 38 positioned so that the outer portion of the arm 25 will overlie the same and thus produce a space 39 between said outer portion of the arm and the bottom of the supplemental recess 38 adapted to receive the arm connecting portion of the related cover lock 35 as the cover is rotated to engage the arm 25 through the passage 36 and establish the locked status of the cover. In this status the cover lock 35 surrounds the arm 25 and positively prevents prying of the arm 25 out of operative relation to said element. Flexing of the arm 25 in my alternative form is controlled in the same manner as in the structure disclosed in Figures 4, 5, 6 and 7, and the same reference characters are applied to the pin and slot connection between said arm and the cover band.

In Figure 13, I have shown a modified construction for securing the gasket 15' in association with the meter cover 15 without the necessity of gluing or cementing the gasket to the cover. To this end I step the side wall of the groove 20 which is disposed innermost of the band 17, so as to provide a shoulder 17' spaced from the rim of the cover, the gasket 15 being held between said rim and the shoulder as clearly shown. This arrangement effectively prevents the gasket from becoming displaced from its proper position during handling of the cover as almost invariably occurs when such gasket is not cemented in place; while at the same time avoiding the necessity of indulging in the disagreeable operation of applying cement.

I claim:

1. In an electricity meter, the combination of a base, a cup-shaped cover having a portion telescoping over the base, bayonet connections detachably locking the cover to the base, each of said connections including an elastic element having a portion thereof free to flex independently of the cover and base, and means permitting flexing of said portion during locking of the connection over a range within its elastic limit essential to the correct positioning of the cover with respect to the base but limiting flexing of said portion beyond said range when effort is made to force the cover from the base while the connection is locked.

2. In an electricity meter, the combination of a base, a cup-shaped cover having a portion telescoping over the base, bayonet connections detachably locking the cover to the base, each of said connections including an elastic element having a portion thereof free to flex independently of the cover and base, and a pin and slot connection between the cover and said portion permitting flexing of said portion during locking of the connection over a range within its elastic limit essential to the correct positioning of the cover with respect to the base but limiting flexing of said portion beyond said range when effort is made to force the cover from the base while the connection is locked.

3. In an electricity meter, the combination of a base, a cup-shaped cover having a portion telescoping over the base, and bayonet connections detachably locking the cover to the base, one element of each connection being in the form of an eye and the other in the form of an arm which engages through said eye when the connection is locked to then secure the elements against relative movement out of cooperative relation in all directions except that incident to locking and unlocking the connection.

4. The combination with an electricity meter cover; of a band carried thereby, said band being formed of a metal strip encircling the cover, a sealing bracket connecting the ends of the strip to complete the band, and means preventing displacement of the band axially of the cover.

5. In an electricity meter, the combination of a base, a cup-shaped cover, a metal band carried by the cover and telescoping over the base, said band having diametrically opposite recesses in its inner face, a plate secured in each recess, each plate being formed to provide an element of a bayonet connection which cooperates with the wall of its related recess to form a groove, and pins on the base for engaging in respective grooves and cooperating respectively with the bayonet connection elements formed by the plates to detachably secure the cover to the base.

6. In an electricity meter, the combination of a base, a cup-shaped cover, a metal band carried by the cover and telescoping over the base, said band having recesses in its inner face; a plate secured in each recess, each plate being formed to provide an arm which cooperates with the wall of its related recess to form a groove, a pin and slot connection between the arm and band limiting flexing of the arm to a range within its elastic limit, and pins on the base for engaging in respective grooves and cooperating respectively with said arms to detachably secure the cover to the base.

7. In an electricity meter, the combination of a base, a cup-shaped cover, a metal band carried by the cover and telescoping over the base, said band having major recesses and supplemental recesses within the limits of said major recesses respectively, a plate secured in each major recess; each plate being formed to provide an arm a portion of which overlies the related supplemental recess and cooperates with the wall of its related major recess to form a groove, and pins on the base for engaging in respective grooves and cooperating respectively with said arms to detachably secure the cover to the base, each of said pins having a circumscribing flange extending into the space between the related arm and the bottom wall of its related supplemental recess.

8. In an electricity meter the combination of a base, a cup-shaped cover, a metal band carried by the cover and telescoping over the base, said band having major recesses and supplemental recesses within the limits of said major recesses respectively, a plate secured in each major recess; each plate being formed to provide an arm a portion of which overlies the related supplemental recess, and U-shaped locking members having their arms secured to the base to provide an eye through which the arms of respective plates engage when the cover is locked to the base, the arm connecting portion of each locking member moving in the space between its related arm and the bottom of its related supplemental recess as the cover is operated to its locked and unlocked positions.

9. In an electricity motor meter, the combination with the base, thereof that constitutes a meter chamber and which is laterally extended to form a terminal chamber; a cover for the meter chamber; a cover for the terminal chamber, said covers having upright apertured wings in the region of and projecting beyond one side of the terminal chamber; and a locking device on the meter base at said side of the terminal chamber, said device comprising separate parts pivoted on a common axis which is parallel to the planes of said wings, one end of one part of this locking device being projectable through the aperture in one of said wings, and the remaining part of the locking device being projectable through the aperture in the other wing.

10. In an electricity meter, the combination of a base, a cup-shaped cover whose rim is laterally extended to form a flange, a metal band surrounding the cover and having a groove in which the flange is received, and a portion adapted to telescope over the base, the side wall of said groove which is innermost the band being stepped to form a pocket at one side of the groove for the reception of a gasket.

11. In an electricity meter, the combination of a base, a cup-shaped cover having a portion telescoping over the base, bayonet connections detachably locking the cover to the base, and means effective when each connection is locked to secure the elements thereof against relative movement out of cooperative relation in a direction radially of the cover, said means and the cooperating elements of the connection being located entirely between the inner face of the cover and the outer face of the base.

12. In an electricity meter, the combination of a base, a cup-shaped cover having a portion telescoping over the base, and bayonet connections detachably locking the cover to the base, the elements of each connection having overlying portions effective when the connection is locked to secure said elements against relative movement out of cooperative relation in a direction radially of the cover, said elements, inclusive of the overlying portions thereof, being located entirely between the inner face of the cover and the outer face of the base.

ALBERT L. EMENS.